United States Patent [19]
Kreithen

[11] Patent Number: 5,774,088
[45] Date of Patent: Jun. 30, 1998

[54] METHOD AND SYSTEM FOR WARNING BIRDS OF HAZARDS

[75] Inventor: Melvin L. Kreithen, Pittsburgh, Pa.

[73] Assignee: The University of Pittsburgh, Pittsburgh, Pa.

[21] Appl. No.: 852,915

[22] Filed: May 8, 1997

Related U.S. Application Data

[63] Continuation of Ser. No. 598,093, Feb. 7, 1996, abandoned, which is a continuation of Ser. No. 280,287, Jul. 26, 1994, abandoned.

[51] Int. Cl.$^6$ .................................................. G01S 13/93
[52] U.S. Cl. ............................................................. 342/22
[58] Field of Search .............................. 342/22; 367/139; 116/22 A

[56] References Cited

U.S. PATENT DOCUMENTS

| | | | |
|---|---|---|---|
| 3,717,802 | 2/1973 | Plevy et al. | 174/117 FF |
| 4,109,605 | 8/1978 | Bachli | 116/22 A |
| 4,562,212 | 12/1985 | Tomlinson, Sr. et al. | 514/690 |
| 4,656,770 | 4/1987 | Nuttle | 116/22 A |
| 4,736,907 | 4/1988 | Steffen | 244/1 R |
| 4,769,794 | 9/1988 | Beuter et al. | 367/139 |
| 5,181,338 | 1/1993 | Chatten | 43/58 |
| 5,270,707 | 12/1993 | Schulte et al. | 340/981 |

OTHER PUBLICATIONS

Behavioral Energetics: The Cost of Survival in Vertebrates, by Melvin L. Kreithen, Ohio State University Press, 1983, pp. 3–28.
Frequency Shift Discrimination: Can Homing Pigeons Locate Infrasounds by Doppler Shifts?, by Douglas Quine and Melvin Kreithen; Journal of Comparative Physiology 141, pp. 153–155.
Infrasound Detection by the Homing Pigeon: A Behavioral Audiogram, The Journal of Comparative Physiology, 129, pp. 1–4, (1979).
Homing Pigeons:, Their Navigation and Sensory Abilities, by Melvin L. Kreithen, New York's Food and Life Sciences, vol. 12, No. 1, 1979, p. 13–15.
Sensory Mechanisms for Animal Orientation—Can Any New Ones Be Discovered?, by Melvin L. Kreithen, Springer Verlag, Berlin Heidelberg 1978, pp. 25–34.

(List continued on next page.)

*Primary Examiner*—Ian J. Lobo
*Attorney, Agent, or Firm*—Flehr Hohbach Test Albritton & Herbert LLP

[57] ABSTRACT

A hazard warning system radiates pulses of microwave energy in the frequency range of 1 GHz to about 40 GHz to alert and warn target flying birds of the presence of wind turbine electrical generators, power distribution systems, aircraft, and other protected areas from hazardous intrusion. The warning system includes a control unit governing pulse control circuitry that outputs pulses ranging from about 5 μs to about 25 μs in duration. These pulses trigger a pulsed source of microwave energy that is coupled to a microwave antenna that emanates the warning radiation. The radiation is sensed by the birds auditory system, attaining their attention to the presence of the protected area. The sensed radiation itself may cause the birds to veer from a collision course, or supplemental hazard-warning radiation including ultraviolet light and infrasound may also be employed. A proximity detector can enhance operating efficiency by steering the antenna toward a detected target. Further, the warning system can remain in a standby mode until alerted by the proximity detector to the presence of target birds, whereupon the warning system begins to output pulsed microwave energy. The pulse control circuitry may be caused to generate complex pulse trains that can preferably evoke a biologically significant response within recipient birds. The warning system operates at the speed of light, and can transmit a benign warning, transparently to humans. Not only is an area protected by the system, but the birds themselves can be protected from the area.

1 Claim, 3 Drawing Sheets

OTHER PUBLICATIONS

Ultraviolet Light Detection by the Homing Pigeon, (reprinted from Nature, vol. 272, pp. 347–348, Mar. 23, 1978).

Kreithen, et al, "Infrasound Detection by the Homing Pigeon: A Behavioral Audiogram", J. Comp. Physiol. 129, 1–4 (1979).

Quine, et al., "Frequency Shift Discrimination: Can Homing Pigeons Locate Infrasounds by Doppler Shifts?", J. Comp. Physiol. 141, 153–155 (1981).

Foster & Finch, "Microwave Hearing: Evidence for Thermoacoustic Auditory Stimulation by Pulsed Microwaves", Science vol. 155, pp. 256–258, 19 Jul. 1974.

Lin, "Microwave Auditory Effects and Applications", Charles C. Thomas Publisher (1978).

Caldera, JD, "The Birds as a Menace to Flight Safety", National Research Council, World Conference on Bird Hazards to Aircraft, 1969 Ontario Canada Tanner et al., "Microwaves—A Potential Solution to the Bird Hazard Problem in Aviation", World Conf. on Bird Hazards to Aircraft, Ont. Can., 1969.

Wasserman et al., "Effects on Chronic Continuous were Microwave Radiation . . . " Space Power, vol. 6, pp. 99–105, 1986.

Tanner, J. A., "Effect of Microwave Radiation on Birds", Nature, vol. 210, (5036), p. 636, May, 1966.

METHOD AND SYSTEM FOR WARNING BIRDS OF HAZARDS

This is a continuation of application Ser. No. 08/598,093 filed Feb. 7, 1996, now abandoned which is a continuation of application Ser. No. 08/280,287 filed Jul. 26, 1994 now abandoned.

FIELD OF THE INVENTION

The present invention relates generally to systems that seek to ward off flying birds, and more specifically to systems for protecting wind turbine electrical power generators, electrical power distribution equipment., flying aircraft, and other objects from danger from flying birds.

BACKGROUND OF THE INVENTION

Flying birds can represent a safety hazard to many objects, and conversely such objects represent a hazard to the birds. Birds colliding with wind turbine electrical generators can not only damage the generators, but generally are injured or die as a result. For example, in northern California, the collision-death of eagles and other protected bird species has resulted in environmental litigation threatening to curtail operation of such generators. Further, birds colliding with high voltage power lines can break or short-circuit the lines, interrupting electrical power distribution. The resultant power outage can also cause damage to the equipment generating and distributing the high voltage. In addition, sparks from broken power lines can start fires.

Birds also present a serious danger to flying aircraft. A medium sized bird striking the windshield or engine an aircraft in flight can damage the aircraft, endangering the safety of those on board. Even modern jet aircraft are susceptible to damage from birds. Not only can they break the windshield, but birds can be sucked into the air intake of a jet engine. The resultant engine damage can require substantial maintenance to repair.

Birds that fly into skyscrapers, monuments and the like can also create serious danger. A bird flying into the window of a skyscraper may cause serious injury to persons on the ground cut by falling broken window glass. Although birds that fly into other large objects may not present as serious a hazard to humans, repairing any resultant damage can be risky and expensive.

It is known in the art to use flashing lights to try to ward birds away from an object. For example, U.S. Pat. No. 5,270,707 to Schute et al. discloses using flashing aircraft lights to ward off in-flight impact with birds. Apparently birds viewing the flashing lights may tend to change their course to avoid collision.

It is generally assumed that flying birds will not knowingly collide with an object. However, the efficiency of Schute et al.'s system is diminished unless the presence of the aircraft is indeed communicated to the birds by the lights. The birds may not be looking at the aircraft (and thus at the lights), perhaps because they are searching for food, are viewing predators including other birds. Alteratively, the lights may not be seen by the birds because visibility is diminished due to inclement weather.

It is also known to use reflector strips that are intended to deter birds in scarecrow-like fashion from a protected area such as a garden. For example, power utility companies often mount passive strips of reflecting material near high voltage towers and lines in an attempt to ward off birds. However, such passive strips are of little use during darkness or other periods of diminished visibility. Further, such passive strips do not actively communicate their presence to the birds, whose attention may in fact be directed elsewhere.

Further, because reflector strips tend to present a substantially constant stimulus pattern to the birds, whatever warning effect they initially provide soon diminishes. This effect is termed "adaptation", and is analogous to the ability of humans to disregard a continuous loud noise (or other stimulus) after hearing the noise for a few minutes.

It is also known to use audible sound waves to try to ward off impact by flying birds. However, if the environment to be protected from avian collision is noisy, the efficiency of such sound waves is diminished. Further, because acoustic waves propagate at only about 1,100 feet/second (335 m/second), any benefit they might provide can literally occur too slowly to be of use.

Unfortunately, the use of light energy or acoustic energy is conspicuous and thus not transparent to humans in the vicinity. What is meant by "not transparent" is that humans not intended to be the target of the hazard communication system can sense the object-announcing light or sound radiation, and become distracted or otherwise annoyed.

In general, active hazard warning systems, e.g., flashing lights or radiated sound waves, tend to be active at all times, even if potential danger from flying birds is not present. Such constant activation is not always desirable, especially if the lights or sound will needlessly annoy humans in the area to be protected. In addition, constant activation is undesirable because it causes adaptation, whereby the recipient birds soon pay little or no attention to the stimulus. Further, constant activation of such systems wastes operating electrical power, and shortens the working lifetime of the hazard warning system.

Thus, there is a need for a hazard communication system to alert and warn birds of the presence of an object or area with which a collision should be avoided. Such system should preferably be transparent to humans in the protected area, and should communicate its warning at the speed of light.

Further, the efficiency of the warning should not be substantially diminished by poor visibility or ambient acoustic noise, or by the target not looking at the source of the system radiation. Such system should also minimize adaption by the birds receiving the warning. Finally, such system should be capable of activation only when a target is sufficiently close to the protected region to warrant communicating the presence of the protected region to the target.

The present invention discloses such a system.

SUMMARY OF THE INVENTION

The present invention communicates the presence of a protected area to flying birds and other vertebrates by radiating pulses of microwave energy to announce the presence of such area. Applicant has discovered that 5 µs to 75 µs pulses of microwave radiation in the 1 GHz to 40 GHz range are sensed by the birds, apparently by stimulating their auditory system.

The pulsed microwave radiation attains the birds' attention in a benign manner, serving to communicate the presence of the protected area to the birds. This attention-grabbing warning is communicated to the birds at the speed of light, without regard to visibility conditions, and without regard to whether the birds happen to be looking toward the protected area.

The effect of the pulsed microwave radiation upon the birds' auditory system may itself cause the birds to veer off course, to avoid collision with the now-noticed protected area. However, collision avoidance may be further enhanced by providing supplemental hazard-warning radiation including light, ultraviolet, and/or sound, including infrasound. The efficiency of such additional warning radiation may be promoted because the birds' attention will have been attained by the present invention.

The present invention includes a control unit that governs pulse control circuitry whose output triggers a pulsed source of microwave energy in the L through $K_a$ bands. The microwave energy is coupled to a microwave antenna system that emanates the protective radiation to announce the presence of the protected area. The microwave energy preferably is radiated at average power levels in the approximate range 1 mw/cm$^2$ to 10 mw/cm$^2$ for considerations of environmental safety. The present invention can be used to communicate to birds the presence of diverse protected areas or objects, for example wind turbine power generators, power transmission systems, and airborne aircraft.

To minimize stimulus adaptation by the recipient birds and to promote effective communication of the warning, the pulse control circuitry preferably permits generating complex, pulse-code modulation type waveforms. Suitably complex pulse trains are believed to evoke a biologically relevant response, causing the recipient bird to be more alert to the warning.

The antenna system preferably is steerable to increase the effective range of the protected area. The present invention may include an optional proximity detector that can detect the presence of nearby targets. The output from the proximity detector may be used to steer the antenna toward the detected target, thus enhancing system operating efficiency.

Further, the proximity detector allows maintaining the present invention in a standby mode until such time as oncoming targets are detected by the proximity detector. Upon target detection, the present invention enters an active mode, and emits the microwave radiation for as long as the targets remain in proximity to the protected area. Such bimodal system operation both conserves operating power and extends the lifetime of the system. Further, such operation tends to reduce adaption by recipient birds.

Because the hazard communicating system uses microwave rather than visible light or acoustic energy, the present invention is transparent to humans not within the radiation target range of the antenna system. Further, the system remains transparent if the supplemental hazard-warning radiation is ultraviolet.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
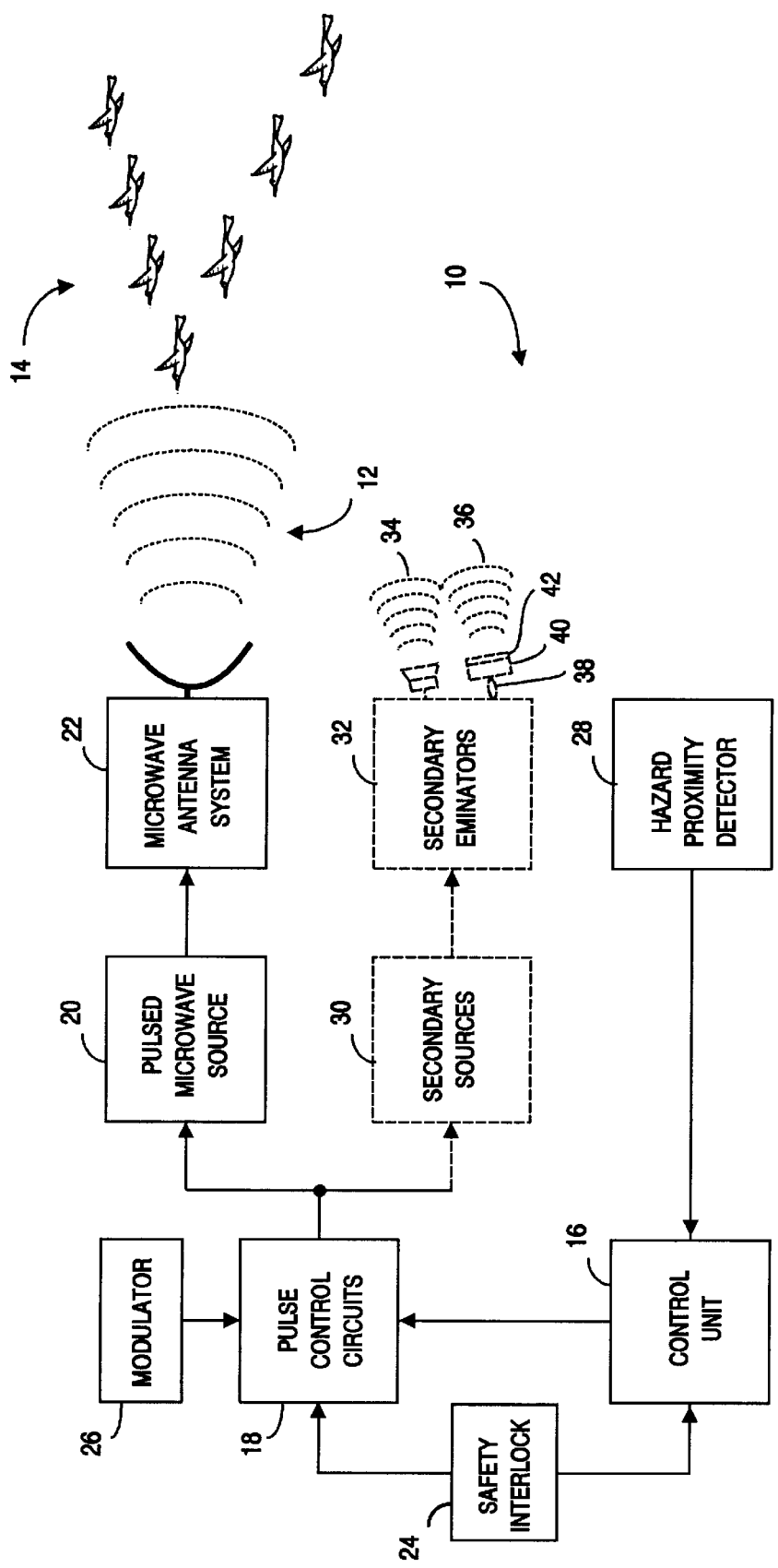
FIG. 1 is a block diagram of an hazard communication system, according to the present invention.

FIG. 1 depicts a hazard communication system 10 as emanating a primary microwave radiation 12 that attains the attention of birds 14 (and possibly bats) within the effective range of the radiation. By thus attaining the immediate attention of the birds, the birds may be warned of the presence of a protected region, and a collision by the birds with the protected region may be avoided.

Alternatively, supplemental secondary eminators may cause the birds to veer off course, avoiding a collision. Such secondary eminators are more likely to be noticed by the birds, whose attention has been attained by the primary pulsed microwave radiation.

More specifically, the present invention 10 includes a control unit 16 that governs operation of pulse control circuitry 18, whose output triggers a pulsed source of microwave energy 20. The pulsed microwave energy is fed to a microwave antenna system 22 and radiated as primary microwave energy 12. Pulse control circuitry 18 preferably outputs fixed duration pulses having a pulse width in the range of about 5 µs to about 75 µs. For a given pulse width, the duty cycle of the pulse train is determined from the average power level of microwave energy to be provided. A narrower pulse width will have a higher duty cycle for a given level of average power than will a longer pulse width.

Optionally, a pulse modulator unit 26 is coupled to the pulse control circuitry 18. Modulator unit 26 introduces a modulated variation in the time between preferably fixed-duration pulse widths, which duration varies from about 0.001 Hz to about 10 KHz. Modulation from unit 26 can advantageously reduce adaptation in recipient birds by varying in a complex manner the patterns of output radiation 12. Further, by suitably programming unit 26, the auditory system of recipient birds 14 may be stimulated using non-thermal microwave energy 12 to evoke biologically relevant responses. For example, a complex pattern of pulsed microwave radiation 12 ideally would evoke the same response in a recipient bird 14 that the alarm call or warning shriek of another bird would evoke. However, evoking other responses could also attain the birds' attention but perhaps less effectively.

Central control unit 16 monitors and controls pulse control circuit 18, which in turn controls the pulse parameters associated with microwave energy source 20. Central control unit 16 typically will also include bi-directional communications to a remote operator site. Safety interlock 24 provides for shutdown of system 10 in case of any potential danger to service personnel or to system components.

Pulse energy source 20 preferably includes a magnetron or a cavity oscillator operating in the range of about 1.0 GHz to about 40 GHz. Applicant has found that pulsed microwave radiation the range 1.0 GHz to about 2.5 GHz is quite effective, and radiation in the approximate range 15 GHz to about 25 GHz should be similarly quite useful. This microwave energy is coupled from source 20 to antenna system 22 using coaxial cable or waveguides. Antenna system 22 includes an antenna whose direction of radiation preferably can be steered to direct the primary microwave emissions 12 toward targets 14.

Applicant has discovered that the emission of such pulsed microwave radiation is sensed by pigeons, apparently by affecting their auditory system in a non-thermal manner. Even without emitting a complex pattern of pulses, the resultant effect upon the birds is believed perhaps to be analogous to a buzzing, clicking, or popping sensation in the ears of a human.

During testing by applicant, applicant exposed pigeons to S and L band pulsed microwave radiation, using fixed pulse widths in the approximate range 5 µs to 75 µs, and more preferably approximately 5 μs to about 25 μs. In providing this microwave energy, pulse width, pulse duty cycle and repetition rate into the pulsed microwave source were controlled to limit the radiation density to less than about 1 mw/cm$^2$ to 10 mw/cm$^2$, an environmentally safe level.

Under laboratory conditions, the ability of such birds to sense the microwave radiation was confirmed by monitoring a standard conditioned cardiac response. Within about three seconds after exposure to this microwave radiation, pigeons having a baseline heartbeat of about 100 beats/minute were found to experience a relatively sudden increase of about 40 beats/minute, a 40% increase. The onset of the heartbeat change occurred within a second or so of the onset of exposure to the pulsed microwave radiation. In reality, the pulsed microwave radiation is sensed instantly by the pigeons, and the delay in attaining a detectable change in heart rate represents a normal response latency.

While applicant's testing was directed to pigeons, it is believed that other birds and possibly bats would also sense their exposure to the pulsed microwave radiation.

As noted, applicant's pulsed microwave energy is sensed by birds, thus attaining their attention, which may include immediate communication to the birds of the presence of the area of object to be protected. Once aware, the birds cab avoid knowingly colliding with the protected area or object. With reference to FIG. 1, after the presence an area or object protected by radiation 12 is communicated to birds 14 by the radiation, the birds should take evasive action. Such action can include veering off a collision course, preferably by flying out of the target zone that is radiated by microwave antenna system 22.

Because avian hazard communication according to the present invention uses microwave rather than visible light or acoustic energy, it is transparent to humans not within the effective radiation path of the antenna system 22. Further, microwave radiation travels at the speed of light, and thus the attention-attaining effect of radiation 12 upon targets 14 can be realized relatively instantaneously. Further, it will be appreciated that the effectiveness of the emanating microwave radiation 12 is not diminished by inclement weather, or the direction in which target 14 may be at the moment.

Optionally, system 10 includes a hazard proximity detector 28 that can include motion detectors, heat detectors, simple radar systems, and the like. The function of detector unit 28 is to detect when targets 14 have approached sufficiently close to the area protected by system 10 to constitute a potential hazard.

Until detector 28 signals a potential hazard, control unit 16 and the remainder of system 10 may remain in a standby mode. In standby mode, no radiation is emanated by antenna system 22, and system 10 consumes relatively little operating power. However, when detector 28 signals that a target 14 is nearing the protected zone, control unit 16 causes pulsed microwave source 20 to output microwave energy that is radiated by antenna system 22.

Once targets 14 have sensed pulsed microwave radiation 12, are alerted to the presence of the area protected by system 10, and have veered their course or otherwise avoided the target zone, detector 28 once again returns system 10 to the standby mode. If desired, hazard proximity detector 28 can share the microwave antenna system 22 for detecting purposes. Further, upon actually detecting a target 14, the hazard proximity detector 28 can cause antenna system 22 to be pointed more directly at target 14.

Thus, the inclusion of a hazard proximity detector 26 can enhance the operating accuracy of system 10. In addition, adaptation by target birds 14 is minimized because radiation 12 is not always present. Further, by permitting standby mode operation until the need to emanate microwave radiation is actually at hand, proximity detector 28 helps conserve system operating power, and also increases system 10 operational lifetime.

Optionally, system 10 can also emit secondary radiations. For example, secondary source unit 30 can provide control signals and voltages to secondary eminator unit 32, which may include flashing lamps used with various lenses and/or filters, acoustic loudspeakers, and the like. These secondary light and/or acoustic emanations can provide additional warning to targets 14, and are more likely to be noticed after the target birds have sensed the primary radiation 12.

One useful secondary emission is acoustic energy 34, especially energy containing frequencies in the approximate range 0.001 Hz to about 10 KHz. Applicant has discovered that the auditory system of birds is quite sensitive at infrasound frequencies. Further, the emission of infrasound frequencies, e.g., 0.001 Hz to about 10 Hz advantageously is transparent to humans.

An earlier discovery of applicant is the birds recognize ultraviolet radiation 36 in the 305 nm to 400 nm range, and especially in the approximate range 325 nm to about 375 nm. Applicant has discovered that an effective way to generate such radiation transparently to humans is to filter components from the output of a strobe-type lamp 38. More specifically, the strobe-lamp output is passed through a filter sandwich comprising a type UG-1 Schott glass layer 40, one surface of which includes a preferably vacuum-deposited anti-red blocking coating 42. (While FIG. 1 shows coating 42 facing away from lamp 38, the sandwich may be reversed so coating 42 faces toward lamp 38.) The net effect is that radiation 36 is broad bandwidth ultraviolet, with no red components that would be visible to humans. Of course, if the radiation were not required to be transparent to humans, the anti-red coating layer could be omitted. The resultant radiation 36 would be broad bandwidth ultraviolet that included red components visible to humans.

In some applications, it may in fact be possible to warn birds 14 of a hazard by using a system 10 that includes secondary eminators 32, but that omits the pulsed microwave source 20 and antenna system 32.

Figure 2:
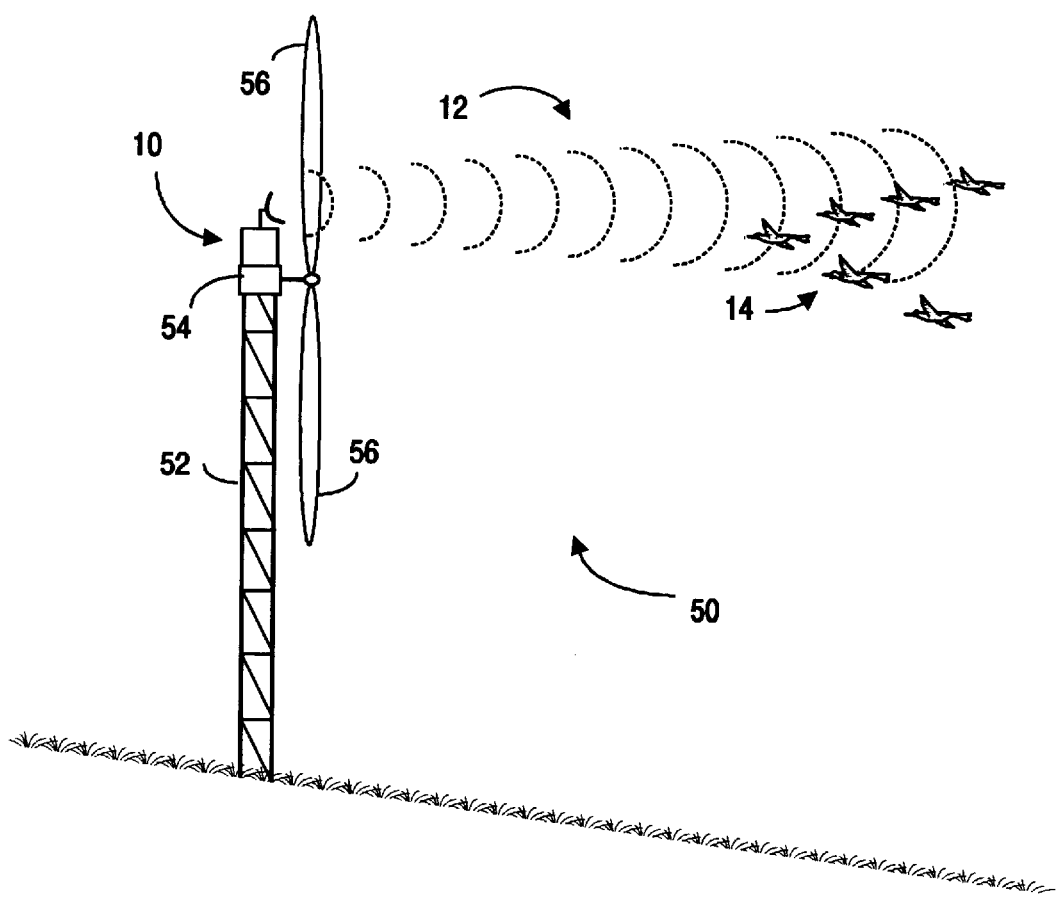
FIG. 2 depicts protection of a wind turbine power generator with a hazard communication system, according to the present invention.

FIG. 2 depicts the use of system 10 to warn birds 14 of the presence of a wind turbine generator system 50. Typically generator system 50 includes a tower 52 that may be perhaps 70 m or more in height, atop which is located an electrical generator 54 that is rotated by wind-blown turbine blades 56. Because the power generating efficiency of system 50 increases with the size of the blades, blades 56 may be 30 m or more in length.

Although FIG. 2 depicts system 10 as mounted at the top of tower 52, system 10 may be disposed elsewhere. It suffices if the pulsed microwave radiation 12 emanating from the microwave antenna system 22 effectively covers the region whose presence is to be communicated to birds 14 to avoid avian impact. If desired, operating voltage for system 10 may be obtained from generator 54, which typically is coupled to an electrical grid carrying electrical power. In applications where there is no coupling to an electrical grid, the generator 54 output voltage could be supplemented by a rechargeable storage battery. This would permit powering system 10, even when the absence of wind caused generator 54 to cease generating voltage.

Birds, bats or the like 14 approaching the protected area of system 10 sense the presence of the pulsating microwave energy 12, apparently by the radiation's effect upon their auditory system. The resultant auditory effect serves to attain the attention of the birds. The microwave energy 12 itself may cause the birds to avoid flying into the protected area, perhaps to minimize the auditory effect. Alternatively, the now more attentive birds may observe the protected area of system 10, and veer off course to avoid contact.

Optionally, if secondary sources and eminators (e.g., elements 28, 30 in FIG. 1) are included, such second radiation may also alert and cause the birds to change course to avoid a collision. Eventually the birds will fly out of regions of the antenna radiation path having sufficient energy density to affect their auditory system. Once the birds have so veered, they no longer endanger the portion of system 50 being protected. Conversely, the protected region would no longer threaten the birds.

The net result is that the hazard presented to system 50 and the hazard to birds 14 from an avian collision will have been avoided. Further, this hazard warning can occur at the speed of light, independently of weather conditions, and occurs transparently to humans in an area not encompassed by the antenna radiation field. In addition, it will be appreciated that the warning is benign in that the levels of emitted microwave energy preferably are sufficiently low in density to alert but not harm the recipient target birds 14.

Figure 3:
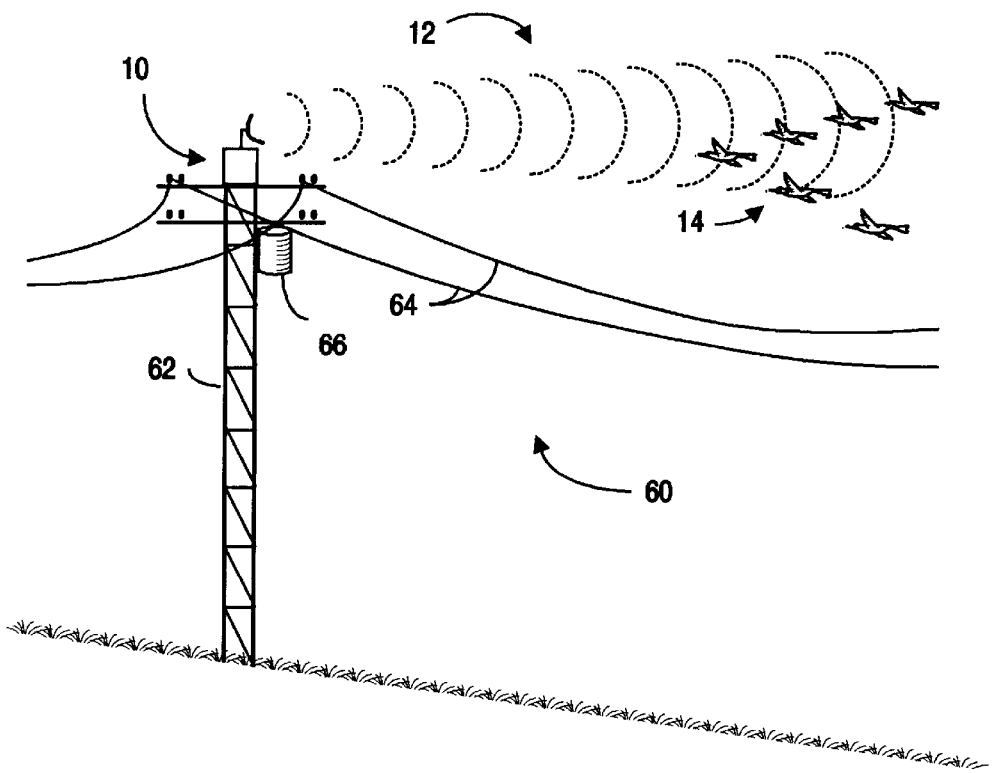
FIG. 3 depicts protection of a power transmission system with a hazard communication system, according to the present invention.

FIG. 3 depicts the application of system 10 to warn birds 14 as to the presence of a protected area of an electric power distribution system 60. The purpose of such warning is to prevent a collision by the birds with the protected area. System 10 may (but need not) include the secondary sources and eminators 30, 32 and the hazard proximity detector 28 described earlier.

In FIG. 3, system 60 includes a utility tower 62 that carries various high voltage conductors 64, a transformer and/or other equipment 66. Of course, system 60 may include other components as well, or as alternatives to what is shown in FIG. 3. Although system 10 is depicted as mounted atop tower 62, system 10 may be disposed elsewhere providing that radiation 12 emanating from the microwave antenna system 22 covers the region whose presence is to be communicated to birds 14, to avoid avian impact. Those skilled in the relevant art will appreciate that operating voltage for system 10 may be obtained by stepping-down voltages present in lines 64.

Although FIG. 3 shows system 10 as protecting a power distribution system 60, tower 62 could in fact represent some other object whose presence is to be communicated to oncoming avians. As such, protected object 62 could represent a skyscraper, a tall monument, among other objects.

Again, flying birds or bats 14 will be warned of the presence of the protected portion of system 60 by the pulsed microwave energy 12 and/or secondary eminators 32. As was described with respect to FIG. 2, the likelihood of avian contact is reduced in a benign manner, preferably transparently to humans in the area.

Figure 4:
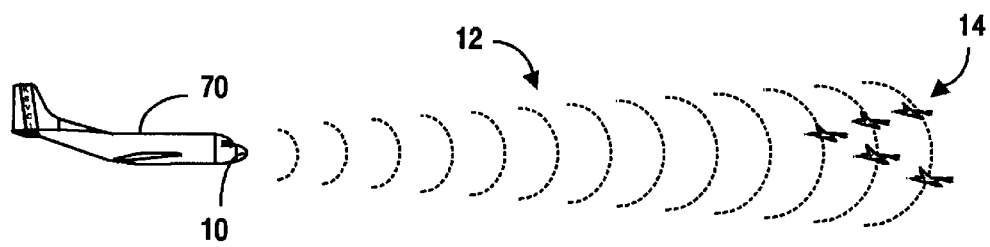
FIG. 4 depicts protection of an aircraft in flight with a hazard communication system, according to the present invention.

FIG. 4 shows another application of the present invention 10, whose components are mounted within an aircraft 70. In flight, system 10 emanates pulsed microwave radiation 12 that is intended to attain the attention of birds and the like 14 to the aircraft, whereupon the birds will veer off course. Possibly system 10 can share existing microwave antenna and other system facilities already present in aircraft 70. Alteratively, system 10 can include its own microwave antenna system 22 as shown in FIG. 1. It is understood that FIG. 4, like FIGS. 2 and 3, is not drawn to scale.

In military aircraft applications, the use of a hazard proximity detector 28 may advantageously permit aircraft 70 to fly over terrain without needlessly emanating radiation 12 until actually required to warn and/or deter targets 14. In this fashion, the presence of aircraft 70 is less likely to be detected by hostile aircraft or ground forces monitoring for pulsed microwave radiation frequencies in the 1.0 GHz to 40 GHz range.

Normally, system 10 emits a benign density of radiation 12 that complies with environmental safety standards. In contrast to such benign use, for an aircraft protection system such as shown in FIG. 4, it may be feasible to use substantially larger magnitudes of pulsed microwave radiation that intentionally damages one or more organs in the birds. Such damage may in fact impair the birds' ability to orient themselves and to continue flying. In this fashion, the safety of aircraft 70 and all on board could be ensured.

Other features and advantages of the invention will appear from the following description in which the preferred embodiments have been set forth in detail, in conjunction with the accompanying drawings. For example, although the preferred embodiments use fixed-width pulses, those skilled in the art will recognize that pulses of variable width may be used as well. Modifications and variations may be made to the disclosed embodiments without departing from the subject and spirit of the invention as defined by the following claims.

What is claimed is:

1. A method for benignly communicating the presence of an object to a flying vertebrate, the method comprising the following steps:

propagating a region at least partially surrounding said object with pulses of microwave energy having an average power level of about 1 mw/cm$^2$, wherein said pulses of microwave energy are selected to elicit a warning signal within said flying vertebrate's auditory system without physically harming said flying vertebrate.

* * * * *